United States Patent
Wagner et al.

(10) Patent No.: US 6,592,225 B2
(45) Date of Patent: Jul. 15, 2003

(54) MULTIPLE PROJECTED IMAGE EDGE BLENDER APPARATUS AND METHOD

(75) Inventors: Joseph C. Wagner, Phoenix, AZ (US); Joel C. Johnson, Lake Oswego, OR (US)

(73) Assignee: Virtual Environment Technologies, LLC, Phoenix, AZ (US)

(*) Notice: Subject to any disclaimer, the term of this patent is extended or adjusted under 35 U.S.C. 154(b) by 0 days.

(21) Appl. No.: 10/189,295

(22) Filed: Jul. 2, 2002

(65) Prior Publication Data

US 2003/0030775 A1 Feb. 13, 2003

Related U.S. Application Data

(60) Provisional application No. 60/301,922, filed on Jul. 2, 2001, and provisional application No. 60/361,403, filed on Mar. 5, 2002.

(51) Int. Cl.[7] .................. G03B 21/26; G03B 21/22; G03B 21/14; H04N 3/26; G02F 1/1335
(52) U.S. Cl. .............. 353/30; 353/94; 353/119; 353/121; 353/122; 353/100; 353/101; 353/89; 348/745; 348/756; 348/757; 348/806; 349/5
(58) Field of Search .................. 353/30, 94, 119, 353/100, 101, 121, 122, 84, 88, 89; 348/745, 756, 757, 779, 806; 349/5, 7, 8; 359/888, 890

(56) References Cited

U.S. PATENT DOCUMENTS

| | | | | | |
|---|---|---|---|---|---|
| 3,715,157 | A | * | 2/1973 | Worthington, Jr. | 353/25 |
| 4,997,270 | A | * | 3/1991 | Shaw | 352/57 |
| 5,023,725 | A | * | 6/1991 | McCutchen | 358/231 |
| 6,017,123 | A | | 1/2000 | Bleha et al. | 353/30 |
| 6,377,306 | B1 | * | 4/2002 | Johnson et al. | 348/383 |
| 6,456,339 | B1 | * | 9/2002 | Surati et al. | 348/745 |
| 2002/0196538 | A1 | * | 12/2002 | Lantz et al. | 359/443 |

* cited by examiner

*Primary Examiner*—Russell Adams
*Assistant Examiner*—Melissa J Koval
(74) *Attorney, Agent, or Firm*—Stoel Rives LLP

(57) ABSTRACT

An image edge blender (58) of this invention installs in an unmodified projector (50) in place of the projection lens (52), which then installs at the output end of the image edge blender assembly. The image edge blender includes a relay lens (64) that relays an objective image plane (66) formed in the projector to an intermediate focal plane (68) formed within the image edge blender. An adjustable aperture assembly (70) includes at least one shutter (96) positioned at or near the intermediate focal plane and movable in rotational, parallel, and transverse directions relative to-the optical axis (78).

16 Claims, 5 Drawing Sheets

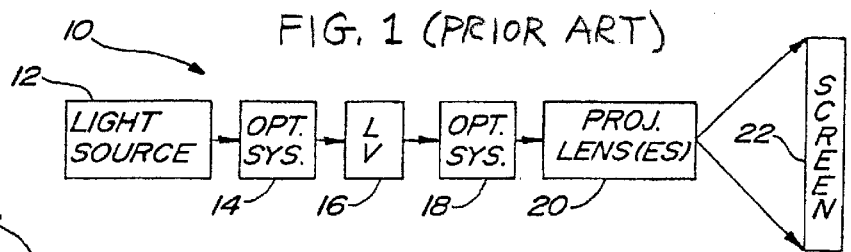
FIG. 1 (PRIOR ART)
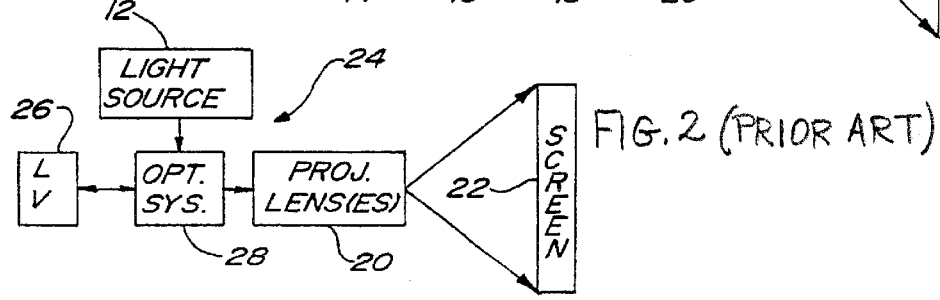
FIG. 2 (PRIOR ART)
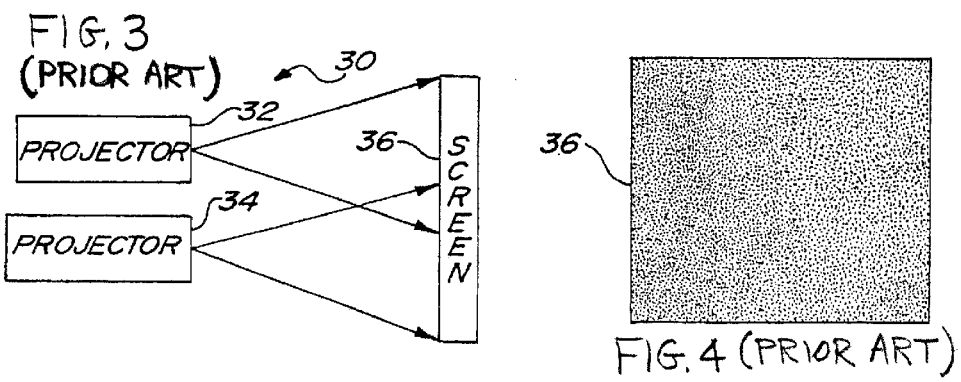
FIG. 3 (PRIOR ART)
FIG. 4 (PRIOR ART)
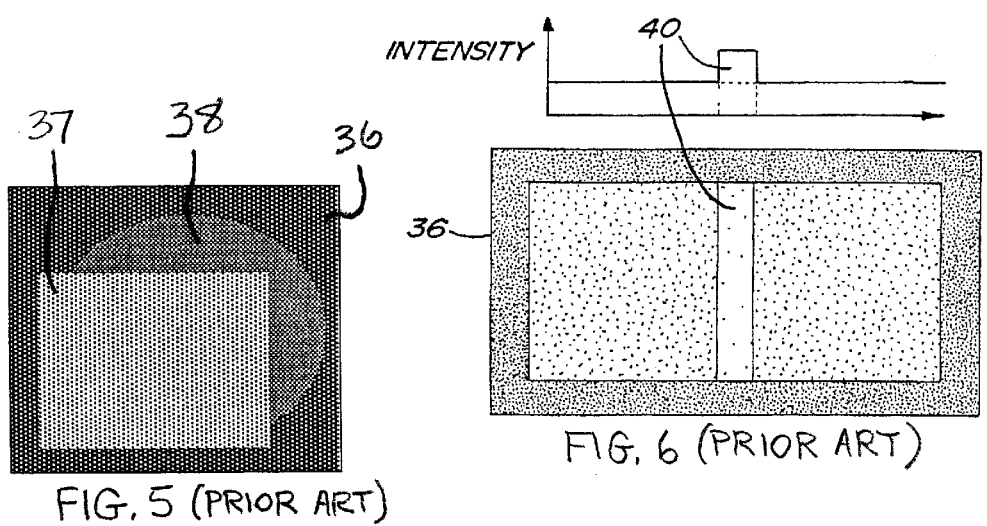
FIG. 5 (PRIOR ART)
FIG. 6 (PRIOR ART)

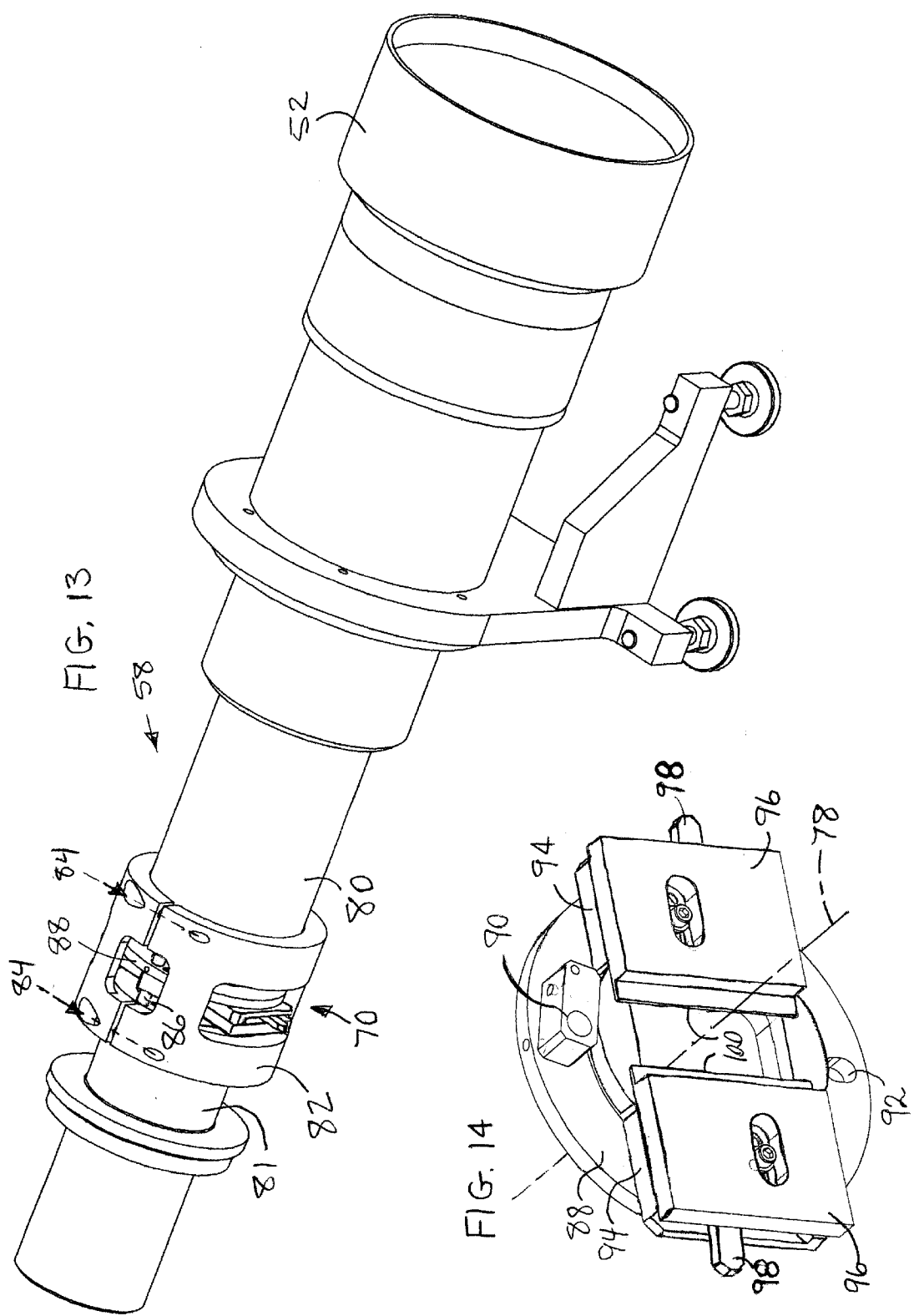

MULTIPLE PROJECTED IMAGE EDGE BLENDER APPARATUS AND METHOD

RELATED APPLICATIONS

This application claims priority from U.S. Provisional Patent application Nos. 60/301,922, filed Jul. 2, 2001 and 60/361,403, filed Mar. 5, 2002.

FEDERALLY SPONSORED RESEARCH OR DEVELOPMENT

Not applicable

TECHNICAL FIELD

This invention relates to image projectors and, more particularly, to image edge blending techniques for use in projection systems employing multiple image projectors to form a perceptually seamless overlapping, composite image.

BACKGROUND OF THE INVENTION

Prior projection systems have employed two or more projectors to form a composite image. In a two projector system, the projected images are positioned side-by-side or one on top of the other. Projector systems can also include an array of projectors. When two projectors are employed, one projector projects a first portion of an image, and a second projector projects a second portion of the image. The first and second projectors are positioned such that the first and second images are projected adjacent to each other onto a screen. Skilled workers will appreciate that it is difficult to precisely align the two or more projectors such that the seams between the first and second images are perceptually invisible to the viewer.

To improve the appearance and perceptual continuity of projected composite images, the first and second projectors are positioned such that the first image slightly overlaps the second image to a form a seamless composite image. When the projectors are partially overlapped, the overlap region contains the illumination level for both projectors, and the overlap region has a greater image intensity because the brightness levels are added together. Accordingly, a bright stripe is produced in the overlap region.

To alleviate this problem, conventional light valve projection systems have employed brightness adjustment electronics to eliminate the excessive brightness in the image overlap region. These electronic smoothing devices can not, however, correct for off-state illumination levels in the image overlap region without significantly reducing image contrast. The off-state, or black level, of many light-valve-based projectors still contain some illumination. Therefore, the overlap region contains the off-state illumination level of both projectors.

The black, or off-state illumination level, is the lowest light level that can be achieved by a light valve projector. It is not, therefore, possible to lower this off-state level further by electronic signal correction. Alternatively, electronic signal correction can be employed to raise the black level of the non-overlapping regions to a level equal to the illumination level in the overlapping region. However, this electronic correction is not desirable because it significantly reduces the overall contrast ratio of the light valve projection system and cannot be used for applications such as night simulation where high contrast is required.

To solve these problems other prior workers have extensively modified the internal optical engines of light-valve-based image projectors to include image edge blending devices that cause controlled edge illumination gradation without sacrificing contrast. For example, U.S. Pat. No. 6,017,123 for PROJECTED IMAGE BLENDING FOR MULTIPLE IMAGES describes placing blending devices, such as filters and/or solid masks, at various positions along the light path of a light-valve-based projection system including a light source, light valve, combiner, projection lens, and screen. Embodiments are described in which the blending device is placed internal to the projector at or near and image plane associated with the light source, light valve, or combiner. In other embodiments the blending device is placed external to the projector between the projection lens and the screen.

All of these embodiments have associated problems. The embodiments external to the projector are difficult to adjust. Some of the embodiments internal to the projector require three blending devices if implemented in a three-path color projector. Placing blending devices in the light source path requires the undue expense of improving the light source optics to properly image the blended edge on the light valve. All of the internal embodiments require either extensively modifying existing projectors or building them originally to include blending devices. Such internal embodiments further preclude adapting existing blending devices to a wide variety of projectors.

What is still needed, therefore, is a simplified method and apparatus for blending illumination levels of overlapping image portions formed by a multiple conventional projector image projection system to form perceptually seamless composite images having maximum contrast.

SUMMARY OF THE INVENTION

An object of this invention is, therefore, to provide an apparatus and a method for adapting an image edge blending assembly to a conventional image projector.

Another object of this invention is to provide an image edge blending apparatus and method that is adaptable to a wide variety of projector types, models, and projection lenses.

Yet another object of this invention is to provide an image edge blending apparatus and method that requires only a single edge blender for use with three-path color projectors.

A further object of this invention is to provide an image edge blending apparatus and method that minimizes the casting of stray light outside projected image margins.

An image edge blender assembly of this invention installs in an unmodified projector in place of the projection lens. The projection lens is then installed at the output end of the image edge blender assembly. The image edge blender assembly includes a relay lens assembly that relays an objective image plane formed in the projector to an intermediate focal plane formed within the image edge blender assembly.

The lens mount of the image edge blender assembly is compatible with the lens mount of the projector. Furthermore, the image edge blender assembly includes a second lens mount for receiving the projection lens. Accordingly, by retooling the lens mounts, the image edge blender assembly can be adapted for use with a wide variety of projectors and projection lenses.

Positioned at or near the intermediate focal plane is an adjustable aperture assembly that includes at least one shutter movable in rotational, parallel, and transverse directions relative to the optical axis. Each shutter includes an aperture edge that is preferably opaque and sharp. The open area surrounding the optical axis as bounded by the aperture edge or edges forms the adjustable aperture of this invention. The aperture is adjustable in parallel distance from the intermediate focal plane, rotatable about the optical axis and adjustable in transverse distance from the optical axis. The aperture edge or edges are positioned at or near the intermediate focal plane to produce the desired image edge brightness gradient from transmissive to obscured. The resulting projected image is the original image produced by the projector, modified by the adjustable aperture such that at least one projected image edge gradually fades to black without perceptual geometric distortion or color aberrations. The modified image at the intermediate focal plane is projected by the projection lens onto a screen.

Additional aspects and advantages of this invention will be apparent from the following detailed description of preferred embodiments thereof, which proceeds with reference to the accompanying drawings.

BRIEF DESCRIPTION OF THE DRAWINGS

FIG. 1 is a functional block diagram of a prior art transmissive light valve projection system.

FIG. 2 is a functional block diagram of a prior art reflective light valve projection system.

FIG. 3 is a top view of a prior art projection system employing multiple light valve projectors for providing an overlapping, composite image.

FIG. 4 represents a screen image of an ideal off-state illumination level.

FIG. 5 represents a screen image of the non-zero brightness, off-state, or black level of a light valve-based projector, and also represents the non-zero brightness level of stray light cast outside the screen image by the projector.

FIG. 6 represents a screen image of an overlapping, composite image produced by two prior art projectors of FIG. 3 in the off-state.

FIG. 13 is an isometric pictorial view of the image edge blender and projection lens assembled of FIG. 10, but shown removed from the digital image projector to reveal an adjustable aperture assembly of this invention.

FIG. 14 is an isometric pictorial view of the image aperture of FIG. 13.

DETAILED DESCRIPTION OF PREFERRED EMBODIMENTS

Figure 7:
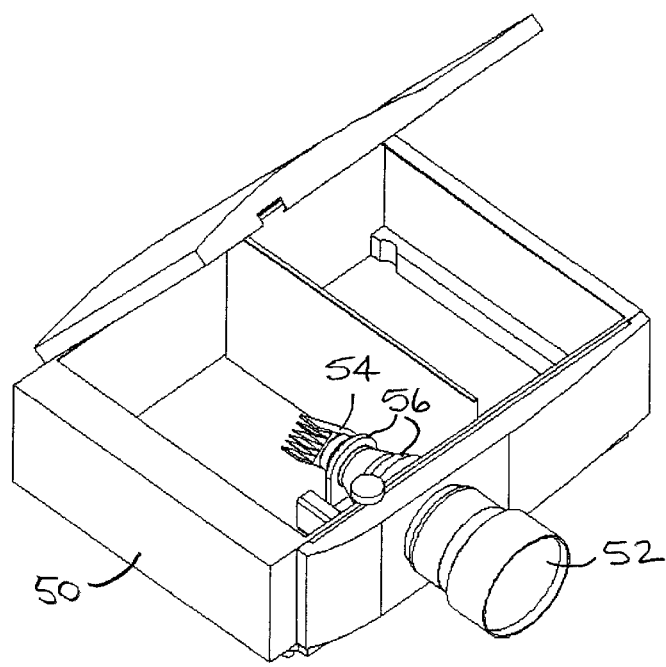
FIG. 7 is an isometric pictorial view of a prior art digital image projector and projection lens suitable for use with this invention.

This invention is useful in a wide variety of image projectors including transmissive- and reflective-type light valve projectors, such as those shown in FIGS. 1 and 2. FIG. 1 shows a prior art transmissive light valve projector 10 that includes a light source 12, one or more optical systems 14 and 18, one or more light valves 16, one or more projection lenses 20, and a screen 22.

FIG. 2 shows a prior art reflective light valve projector 24 that includes light source 12, one or more light valves 26, an optical system 28, one or more projection lenses 20, and screen 22. Projectors 10 and 24 can be monochrome or full color. Light source 12 is preferably an arc lamp. Such projector systems can employ beam splitters and dichroic filters in the optical systems to create three channel full color images. Different light valve systems can also employ polarized light (birefringent light valve) or light mechanically redirected from an incident light beam. Light source 12 provides the incident light beam, which is directed by the optical system onto one surface of light valve 26 or through light valve 16 to produce modulated image carrying light. Projection lens 20 propagates the modulated light toward screen 22.

The light valves employed can be photoactivated, birefringent liquid crystal reflective mode, matrix addressed birefringent liquid crystal diode (LCD), scattering mode LCD, digitally addressed micromirror (DLP™) light valves, or other suitable light valves of types apparent to skilled workers.

FIG. 3 shows a projection system 30 including first and second light valve projectors 32 and 34. First light valve projector 32 projects a first image onto screen 36, and second-light valve projector 34 projects a second image onto screen 36. First and second projectors 32 and 34 are arranged such that the first and second images partially overlap.

FIG. 4 shows an idealized off-state or black level of a single projector. The ideal off-state includes no illumination or brightness. If the screen 36 is located in an ideal dark viewing room, the edge of a projector image is not detectable when the dark state is projected. Unfortunately, when light valve projectors are employed, the typical dark level is less than ideal and some illumination occurs.

FIG. 5 shows a non-zero off-state 37 of a typical light valve projector. As can be appreciated, the off-state illumination is visible. The outer edges of the projected image can be seen against the ideally dark remainder of screen 36. Moreover, FIG. 5 also shows stray light 38 cast by the projector. Stray light 38 is also referred to as overshoot, halo, or overfill light that is scattered and reflected within the projector and eventually cast through the projection lens and onto the screen.

FIG. 6 shows that when two light valve projectors are positioned such that their projected images overlap as shown in FIG. 3, the non-zero illumination or brightness of each of the images is added together in the overlap region to form a bright stripe 40. Because the off-state brightness is a minimum, the previously described brightness adjustment electronics cannot eliminate bright stripe 40 nor stray light 38 without adversely affecting the contrast ratio of the light valve projection system. The visible bright stripe 40 and stray light 38 also reduce the image quality of the composite image.

To correct these image deficiencies, an image edge blender of this invention adapts to conventional video projectors without requiring projector modifications. The image edge blender combines the simplicity of external edge blenders with the image and color fidelity of internal edge blenders.

FIG. 7 shows a prior art digital image projector 50 and a projection lens 52, both of which are suitable for use with this invention. Projector 50 is preferably a Vistagraphics model 2500 or 5000 projector manufactured by Christie Digital Systems of Cypress, Calif. The top lid of projector 50 is shown open to reveal an optical combiner 54 and a lens mount 56 for receiving projection lens 52. Other internal components of projector 50 are not shown because they are unnecessary for describing this invention.

Figure 8:
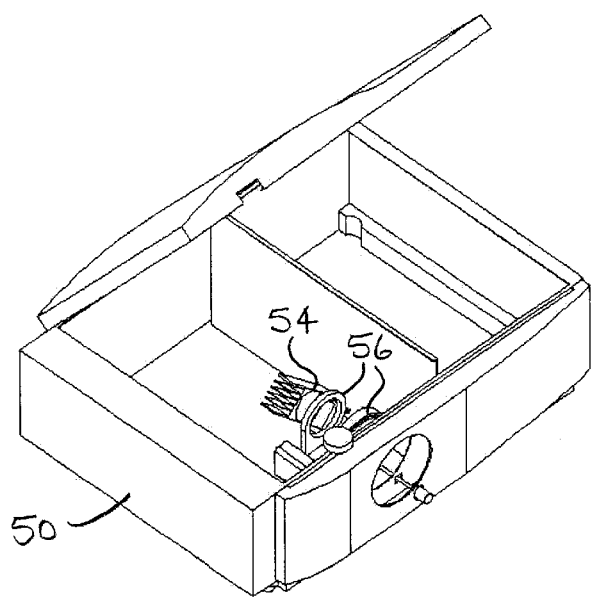
FIG. 8 is an isometric pictorial view of the digital image projector of FIG. 7 with the projection lens removed.

FIG. 8 shows digital image projector 50 with projection lens 52 removed. Removing projection lens 52 is a first step in adapting projector 50 to receive the image edge blender of this invention.

Figure 9:
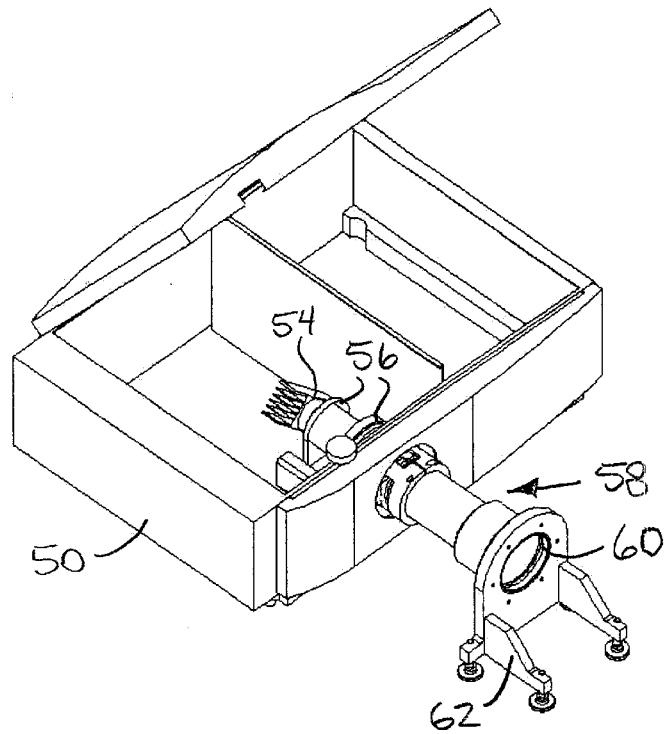
FIG. 9 is an isometric pictorial view of the digital image projector of FIG. 7 with an image edge blender of this invention installed in place of the projection lens.

FIG. 9 shows digital image projector 50 with an image edge blender assembly 58 of this invention installed in place of the projection lens 52 (not shown). Installing image edge blender assembly 58 into lens mount 56 is a second step in adapting projector 50. Image edge blender assembly 58 includes mounting features that are compatible with lens mount 56. The mounting features and optical details of image edge blender assembly 58 are described with reference to FIG. 11. Image edge blender assembly 58 further includes a lens mount 60 that is compatible with projection lens 52 (not shown). An adjustable support stand 62 provides mechanical stability and positional adjustability for projector 50, image edge blender assembly 58, and projection lens 52.

Figure 10:
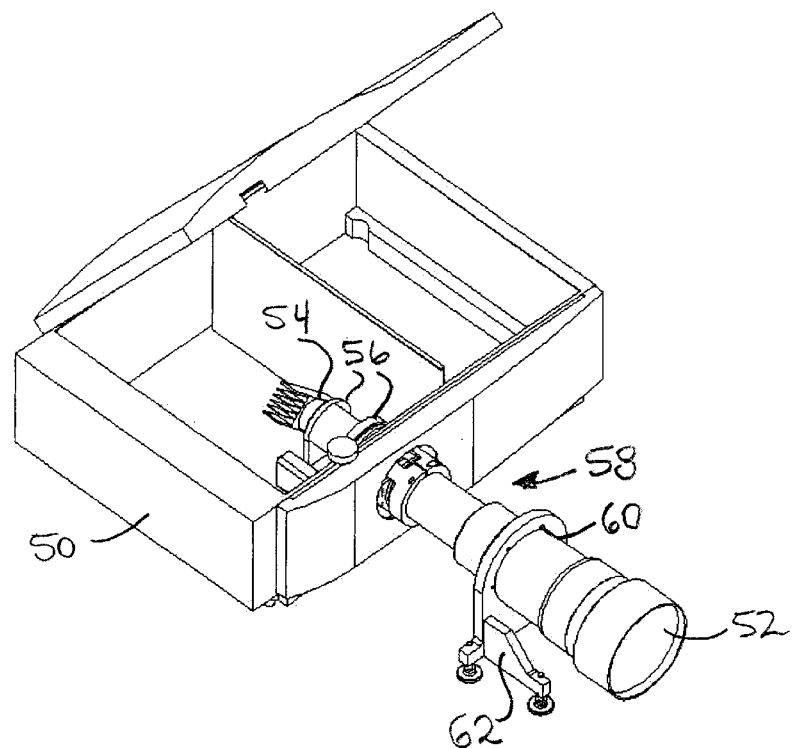
FIG. 10 is an isometric pictorial view of the digital image projector and image edge blender of FIG. 9 with the projection lens of FIG. 7 attached to the image edge blender.

FIG. 10 shows digital image projector 50 and image edge blender assembly 58 with projection lens 52 attached to lens mount 60 of image edge blender assembly 58. Installing projection lens 52 into lens mount 60 of image edge blender assembly 58 is a third step in adapting projector 50.

Additional steps include adapting multiple image edge blender assemblies 58 to multiple respective digital projectors 50, aligning them to form two or more adjacent overlapping projected images, and adjusting the associated edge blender assemblies 58 to correct for brightness defects in the overlapping image regions.

Figure 11:
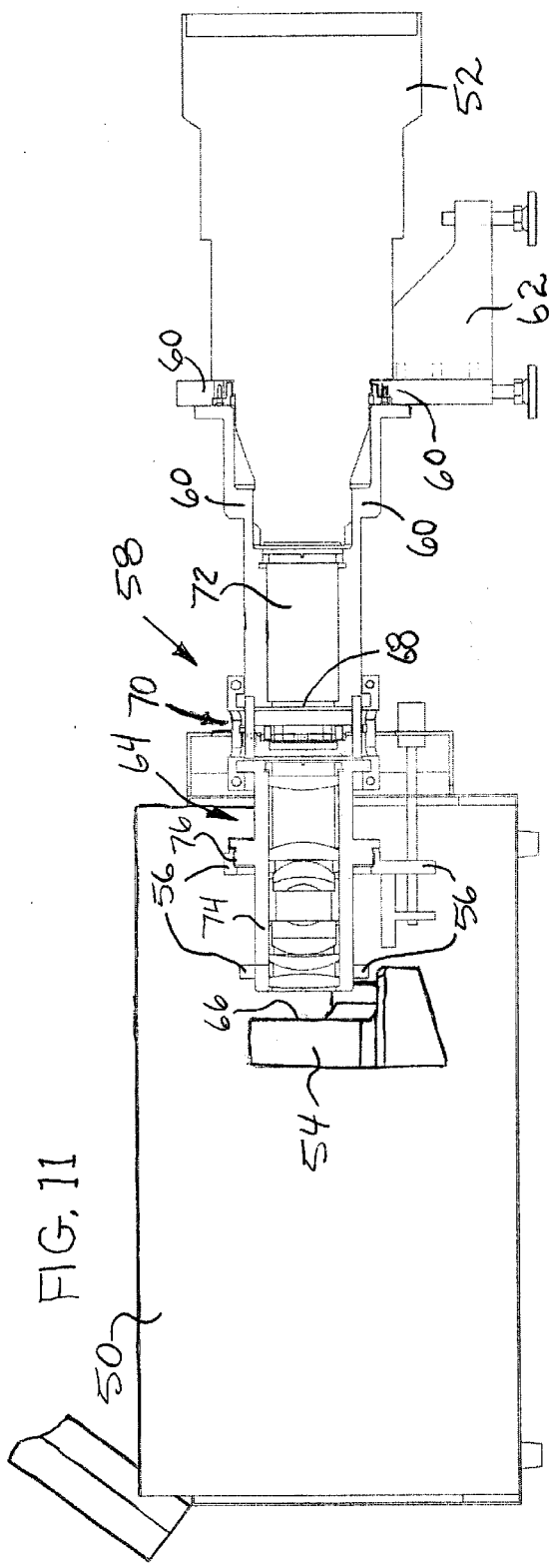
FIG. 11 is a sectional side pictorial view of the digital image projector, image edge blender, and projection lens of FIG. 10.

FIG. 11 shows internal mechanical and optical details of digital image projector 50, image edge blender assembly 58, and projection lens 52 as assembled in FIG. 10. Image edge blender assembly 58 includes a relay lens assembly 64 that relays an objective image plane 66 formed at optical combiner 54 to an intermediate focal plane 68 formed within image edge blender assembly 58. Positioned at or near intermediate focal plane 68 is an adjustable aperture assembly 70 that is described in detail with reference to FIGS. 13 and 14.

To ensure compatibility with projection lens 52, relay lens 64 preferably operates at unity magnification and has distortion no greater than a single pixel. If digital image projector 50 includes a three path color optical engine, then relay lens 64 should include compensation for any aberrations produced by optical combiner 54. Moreover, a spherical aberration corrector 72 comprising a length of glass is preferably positioned after intermediate focal plane 68 to simulate for projection lens 52 the optical path length of optical combiner 54.

Image edge blender assembly 58 further includes a cylindrical portion 74 and a threaded portion 76 designed for compatibility with lens mount 56 of digital image projector 50. Furthermore, lens mount 60 of image edge blender assembly 58 includes the same features as lens mount 56. Accordingly, image edge blender assembly 58 can be adapted for use with any projection lens designed for operation with digital image projector 50.

Figure 12:
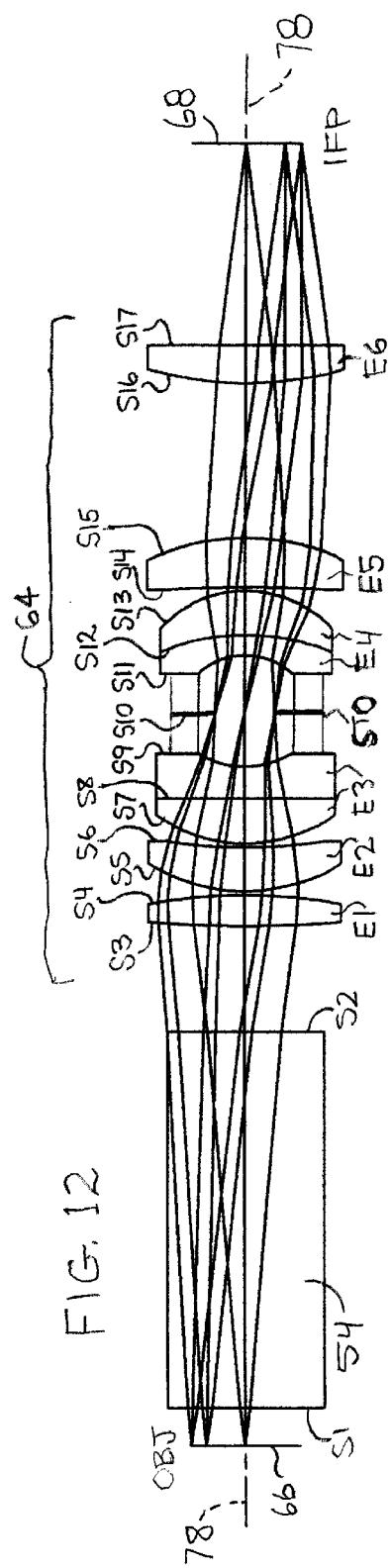
FIG. 12 is a sectional side pictorial view showing light ray propagation paths through optical elements of the digital image projector and image edge blender of this invention.

FIG. 12 shows the preferred optical element details associated with relay lens assembly 64. The optical design comprises objective image plane 66 followed by 18 surfaces including S1 through S17 and intermediate focal plane 68. Surfaces S1 and S2 are the respective entry and exit surfaces of optical combiner 54. Relay lens assembly 64 comprises surfaces S3 through S17 on optical elements E1 through E6. Surface S10 is a "stop" element. The optical elements associates with relay lens assembly 64 are assembled along an optical axis 78. Skilled workers will understand the detailed optical design data associated with relay lens assembly 64 that are set forth below in Tables 1–3.

TABLE 1

LENS SURFACE DATA SUMMARY

| Surf | Type | Comment | Radius | Thickness | Glass | Dia | Conic |
|---|---|---|---|---|---|---|---|
| 66 Obj | STD | | Infinity | 10 | | 28 | 0 |
| S1 | STD | | Infinity | 100 | BK7 | 50.8 | 0 |
| S2 | STD | | Infinity | 23.54799 | | 50.8 | 0 |
| S3 | STD | EL1 | 332.105 | 9.937871 | LAF3 | 50 | 0 |
| S4 | STD | | −118.6485 | 2.736733 | | 50 | 0 |
| S5 | STD | EL2 | 47.244 | 9.817658 | SK2 | 50 | 0 |
| S6 | STD | | 130.886 | 1.676888 | | 42 | 0 |
| S7 | STD | EL3 | 38.8366 | 12.0138 | LAF2 | 46 | 0 |
| S8 | STD | | Infinity | 8.530074 | SF6 | 46 | 0 |
| S9 | STD | F | 23.876 | 13.89867 | | 24 | 0 |
| S10 STO | STD | | Infinity | 15.35148 | | 15.41481 | 0 |
| S11 | STD | EL4 | −17.7038 | 5.27829 | SF6 | 24 | 0 |
| S12 | STD | | −55.245 | 11.94415 | LAF2 | 44 | 0 |
| S13 | STD | | −29.21 | 1 | | 44 | 0 |
| S14 | STD | EL5 | −292.2016 | 12.09511 | SK2 | 38 | 0 |
| S15 | STD | | −58.0644 | 37.83444 | | 50.8 | 0 |
| S16 | STD | EL6 | 87.4522 | 10.02155 | LAF3 | 50.8 | 0 |
| S17 | STD | | Infinity | 54.76053 | | 50.8 | 0 |
| 68 IFP | STD | | Infinity | | | 28.05751 | 0 |

TABLE 2

GENERAL LENS DATA

| | |
|---|---|
| Surfaces | 18 |
| Stop | 10 |
| Effective Focal Length | 268.3876 (in image space) |
| Image Space NA | 0.1250213 |
| Object Space NA | 0.125 |
| Paraxial Magnification | −09998272 |
| Primary Wave | 0.5875618 |
| Lens Units | Millimeters |

TABLE 3

FIELD DATA

| Field type: | Object height in Millimeters | | |
|---|---|---|---|
| # | X-Value | Y-Value | Weight |
| 1 | 0.000000 | 0.000000 | 1.000000 |
| 2 | 0.000000 | 10.000000 | 1.000000 |
| 3 | 0.000000 | 14.000000 | 1.000000 |

FIG. 13 shows image edge blender assembly 58 and projection lens 52 assembled together, but removed from digital image projector 50 to reveal mounting details of adjustable aperture assembly 70. FIG. 14 further reveals structural details of adjustable aperture assembly 70.

Referring to FIG. 13, image blender assembly 58 includes barrel housings 80 and 81. Adjustable aperture assembly 70 includes a split clamping collar 82 that is sized to fit around barrel housings 80 and 81 to secure them together and allow rotatably positioning the mounting of adjustable aperture assembly 70 on barrel housings 80 and 81. When properly positioned, clamping screws 84 (two of four shown) are tightened to secure adjustable aperture assembly 70 to barrel housings 80 and 81. Adjustable aperture assembly 70 further secures a pair of pins 86 (only one shown) that are oriented parallel to and spaced apart from optical axis 78 (FIG. 12).

Referring also to FIG. 14, an aperture mounting ring 88 includes a slide bearing 90 and a slot 92 through which pins 86 protrude to captivate aperture mounting ring 88 within adjustable aperture assembly 70. Slide bearing 90 and slot 92 allow adjustment of mounting ring 88 in directions parallel to optical axis 78. Slide bearing 90 holds mounting ring 88 in an orientation transverse to optical axis 78. Alternatively, slide bearing 90 could be eliminated by increasing the thickness of mounting ring 88.

Attached to mounting ring 88 is a rotational mount 94 to which is attached at least one movable shutter 96 (two shutters are shown). Each shutter 96 is movable in a direction transverse to optical axis 78 by a shutter position control 98. Each shutter 96 further includes an aperture edge 100 that is preferably opaque and sharp. The open area surrounding optical axis 78 as bounded by aperture edge or edges 100 forms the adjustable aperture of this invention. The aperture is movable relative to intermediate focal plane 68 (FIG. 12) because aperture mounting ring 88 is slidable on pins 86. The aperture is rotatable about optical axis 78 because movable shutters 96 are mounted on rotational mount 94. The aperture edge distance from the optical axis is adjustable because movable shutters 96 are movable by shutter position controls 98.

Aperture edge or edges 100 are positioned at or near intermediate focal plane 68 to produce the desired image edge brightness gradient from transmissive to obscured. Aperture edge or edges 100 also block from projection any stray light 38 that would otherwise be cast into areas adjacent to the image margins. The resulting projected image is the original image produced at objective focal plane 66 (FIG. 12), modified by the adjustable aperture such that at least one projected image edge gradually fades to black without perceptual geometric distortion, color aberrations, or stray light. The modified image at intermediate focal plane 68 is projected by projection lens 52 onto screen 36 (FIG. 3).

Images produced by adjacent projectors are adjusted in position and gradation such that the graded image regions overlap. Registration of the overlapped images is significantly easier by virtue of the graded intensity edges and adjustability of image edge blender assembly 58. Aperture edge or edges 100 are individually adjustable for left and right control and rotationally so that their parallelism remains constant and their overall relative position is rotationally adjustable by 360° to enable "wide" screen and/or vertical image orientations.

Skilled workers will recognize that portions of this invention may be implemented differently from the implementations described above for preferred embodiment. For example, edge blending assembly could be implemented within the video projector in some applications. By retooling the lens mounts, the image edge blender assembly can be adapted to many projectors irrespective of the projection technique employed. Also image projectors employing multiple lenses could employ multiple edge blender assemblies. The aperture shutters may, of course, be implemented as plated glass inserts, thickness-tapered elements, light-transmission tapered elements, and even razor blades. Moreover, the invention could employ automated and/or remote adjustment functions, such as shutter adjustment, shutter focus, remote focus from lens not projector, and electronic memory of positions and settings.

It will be obvious to those having skill in the art that many changes may be made to the details of the above-described embodiments of this invention without departing from the underlying principles thereof. The scope of this invention should, therefore, be determined only by the following claims.

We claim:

1. A method of adapting image projectors for use in a multiple projector system, the image projectors including associated first lens mounts to which are coupled associated projection lenses, comprising:

removing the projection lenses from the first lens mounts;

mounting an edge blender assembly including a relay lens, an adjustable aperture, and a second lens mount to each of the first lens mounts; and mounting the projection lenses to associated ones of the second lens mounts.

2. The method of claim 1, further including positioning the image projectors in the multiple projector system such that images projected by the multiple projectors include at least one overlapping adjacent image portion.

3. The method of claim 2, further including adjusting the adjustable aperture such that the overlapping adjacent image portion is perceptually blended with a remainder of the projected images.

4. The method of claim 1, in which each edge blender assembly further includes a spherical aberration correction lens positioned between the relay lens and the second lens mount.

5. The method of claim 1, in which the image projectors each form an image at an objective image plane and each relay lens is a unity magnification relay lens that forms a substantially duplicate image at an intermediate focal plane.

6. The method of claim 5, further including positioning each adjustable aperture at or near the intermediate focal plane.

7. An apparatus for adapting an image projector for use in a multiple projector system, the image projector forming an image at an objective image plane and including a first lens mount for coupling to a projection lens, comprising:

an edge blender assembly coupled to the first lens mount, the edge blender assembly including:
 a relay lens forming at an intermediate focal plane an intermediate image that is a substantial duplicate of the image at the objective image plane;
 an adjustable aperture assembly positioned at or near the intermediate focal plane; and
 a second lens mount for coupling the edge blender assembly to the projection lens.

8. The apparatus of claim 7, in which the relay lens is a unity magnification relay lens.

9. The apparatus of claim 7, in which the image projector is a digital image projector.

10. The apparatus of claim 7, in which the edge blender assembly further includes a spherical aberration correction lens positioned between the intermediate focal plane and the second lens mount.

11. The apparatus of claim 7, in which the intermediate image formed at the intermediate focal plane includes at least one image edge portion that is blended by the adjustable aperture assembly from a transmissive brightness to an obscured brightness.

12. The apparatus of claim 7, in which the adjustable aperture assembly further includes an optical axis extending longitudinally therethrough, and at least one aperture edge that is positionable in a direction transverse to the optical axis.

13. The apparatus of claim 7, in which the adjustable aperture assembly further includes an optical axis extending longitudinally therethrough, and at least one aperture edge that is positionable in a direction parallel to the optical axis.

14. The apparatus of claim 7, in which the adjustable aperture assembly further includes an optical axis extending longitudinally therethrough, and at least one aperture edge that is positionable angularly about the optical axis.

15. The apparatus of claim 7, in which the adjustable aperture assembly further includes at least one movable shutter having an aperture edge that causes a brightness gradation across an associated edge region of the intermediate image.

16. The apparatus of claim 15, in which the aperture edge includes at least one of a plated glass insert, a thickness-tapered element, a light-transmission tapered element, a razor edge, and a sharp edge.

\* \* \* \* \*